United States Patent [19]
Quin

[11] Patent Number: 5,431,865
[45] Date of Patent: Jul. 11, 1995

[54] FLAME TRIMMING APPARATUS AND METHOD

[75] Inventor: Willoughby M. Quin, New Haven, Conn.

[73] Assignee: The Plastic Forming Company, Inc., Woodbridge, Conn.

[21] Appl. No.: 151,504

[22] Filed: Nov. 12, 1993

Related U.S. Application Data

[63] Continuation-in-part of Ser. No. 956,153, Oct. 5, 1992, Pat. No. 5,273,422.

[51] Int. Cl.$^6$ .................. B29C 49/72; B29C 37/02
[52] U.S. Cl. ..................... 264/40.1; 83/76.1; 83/914; 264/80; 264/161; 425/142; 425/164; 425/275; 425/527; 425/806
[58] Field of Search ............ 264/80, 161, 40.1, 962; 425/289, 295, 806, 806 R, 142, 164, 527, 531, 553; 63/914, 76.1, 72, 73

[56] References Cited

U.S. PATENT DOCUMENTS

| | | | |
|---|---|---|---|
| 2,670,645 | 3/1954 | Pipper et al. | 425/268 |
| 3,055,047 | 9/1962 | Preissler | 425/459 |
| 3,702,789 | 11/1972 | Dungan | 364/80 |
| 4,279,584 | 7/1981 | Hawrylo | 264/161 |
| 4,518,551 | 5/1985 | Lin | 264/161 |
| 4,535,223 | 8/1985 | Westerman, Jr. | 425/810 |
| 4,535,224 | 8/1985 | Westerman, Jr. | 425/810 |
| 4,549,066 | 10/1985 | Piccioli et al. | 425/806 |
| 4,738,605 | 4/1988 | Aerts et al. | 425/142 |
| 4,894,958 | 1/1990 | Takasaki | 264/161 |

FOREIGN PATENT DOCUMENTS

| | | | |
|---|---|---|---|
| 295458 | 12/1988 | European Pat. Off. | 425/289 |
| 2504447 | 10/1982 | France | 264/80 |
| 1390050 | 4/1988 | U.S.S.R. | 425/289 |
| 1390051 | 4/1988 | U.S.S.R. | 425/289 |

*Primary Examiner*—Jay H. Woo
*Assistant Examiner*—Duane S. Smith
*Attorney, Agent, or Firm*—Bachman & LaPointe

[57] ABSTRACT

An apparatus and method for trimming a contoured non-round workpiece includes a torch for flame treating or trimming the workpiece by impinging a flame on the workpiece, a holding member for supporting the workpiece, the holding member being rotatably mounted relative to the torch, and a control member for cooperating the holding member with the torch so that the torch follows the contour of the workpiece when the holding member is rotated relative to the torch. The control member generates an electronic image of the workpiece and guides the torch along the contour of the workpiece in accordance with the image.

14 Claims, 2 Drawing Sheets

FLAME TRIMMING APPARATUS AND METHOD

CROSS-REFERENCE TO RELATED APPLICATION

This application is a continuation-in-part of and commonly assigned U.S. patent application Ser. No. 07/956,153, filed Oct. 5, 1992 now U.S. Pat. No. 5,273,422.

BACKGROUND OF THE INVENTION

1. Field of the Invention

The invention relates generally to the field of molding of plastic articles and, more particularly, to a method and apparatus for trimming molded plastic articles with a flame treatment means.

2. Description of the Related Art

Procedures for blow molding double wall plastic articles typically involve the formation of flash or excess material around the perimeter of the part being formed. This flash is pressed thin, or "pinched off" by means of metal to metal contact areas of the opposing mold halves, at the mold parting line and adjacent to the mold cavity or cavities. This pinchoff area is typically relatively wide, on the order of 0.025 to 0.050 inches. When the flash is torn or cut from the molded part, a significant amount of the pinched flash remains attached to said part and must be subsequently removed by mechanical trimming.

In response to the pinchoff problem, a mold construction was developed which is known as "zero land" construction whereby the amount of pinch flash produced is greatly reduced. However, when the flash is removed from the part, the remaining parting line edge is sharp. This sharp edge is unacceptable in some instances. For example, plastic cases manufactured to hold children's toys cannot have sharp edges due to the risk of injury to children.

In both of the above processes, pinchoff and sharp edges have traditionally been removed by hand with a knife. This hand trimming causes several problems, such as the direct increase in labor cost, inconsistent trimming quality and the possibility of repetitive motion syndrome in the wrists of the hand trimmers.

Another approach has been to heat trim the edges of "zero land" molded articles with a hand held propane torch. This method produces acceptably rounded edges of the articles but still involves the above-described problems associated with hand trimming.

It is therefore desirable to trim blow molded plastic articles in a procedure which does not involve substantial additional labor costs, which produces consistent quality trimming, and which does not pose the risk of injury to operators.

It is, therefore, the principal object of the present invention to provide an apparatus for trimming blow molded plastic articles which does not involve a "by hand" procedure.

It is a further object of the present invention to provide an apparatus for trimming such plastic articles which produces consistent quality trimming of sharp edges of plastic molded articles, especially with a heat or flame treatment means.

It is a still further object of the present invention to provide an apparatus and method for trimming molded plastic articles which does not involve repetitive hand motions of operators and which, therefore, does not pose the risk of repetitive motion syndrome.

It is another object of the present invention to provide such an apparatus which is readily adaptable to workpieces of different size and contour.

It is yet another object of the invention to provide such an apparatus wherein trimming is facilitated even with workpieces having steeply profiled surfaces.

Other objects and advantages will become apparent to those skilled in the art upon a consideration of the following disclosure of the invention.

SUMMARY OF THE INVENTION

The foregoing objects and advantages are readily attained by the present invention. An apparatus is provided for flame treating the sharp edges of non-round or obround molded plastic articles. According to the invention, the apparatus comprises flame treatment means, for trimming the workpiece by impinging a flame on the workpiece, holding means for supporting the workpiece, the holding means being rotatably mounted relative to the flame treatment means; and control means for cooperating the holding means with the flame treatment means so that the flame treatment means follows the contour of the workpiece when the holding means is rotated relative to the flame treatment means.

In accordance with the preferred embodiment of the invention, the control means comprises means for generating an electronic image having a contour following the contour of the workpiece, and means for guiding the flame treatment means according to the contour of the electronic image.

Further, the control means may preferably comprise a personal computer programmed to generate the electronic image based upon the workpiece to be trimmed, and a motion controller, operatively connected to the personal computer and associated with the flame treatment means so as to linearly displace the flame treatment means toward and away from the holding means in accordance with the electronic image.

BRIEF DESCRIPTION OF THE DRAWINGS

A detailed description of the preferred embodiments of the invention follows, with reference to the attached drawings, wherein.

DETAILED DESCRIPTION

The invention relates to an apparatus for trimming sharp edges from non-round plastic articles, especially plastic blow molded articles. The apparatus serves to properly guide a torch along the edge of the workpiece to be treated while the workpiece is rotated relative to the torch so as to obtain uniform and efficient treatment of the workpiece.

Figure 1:
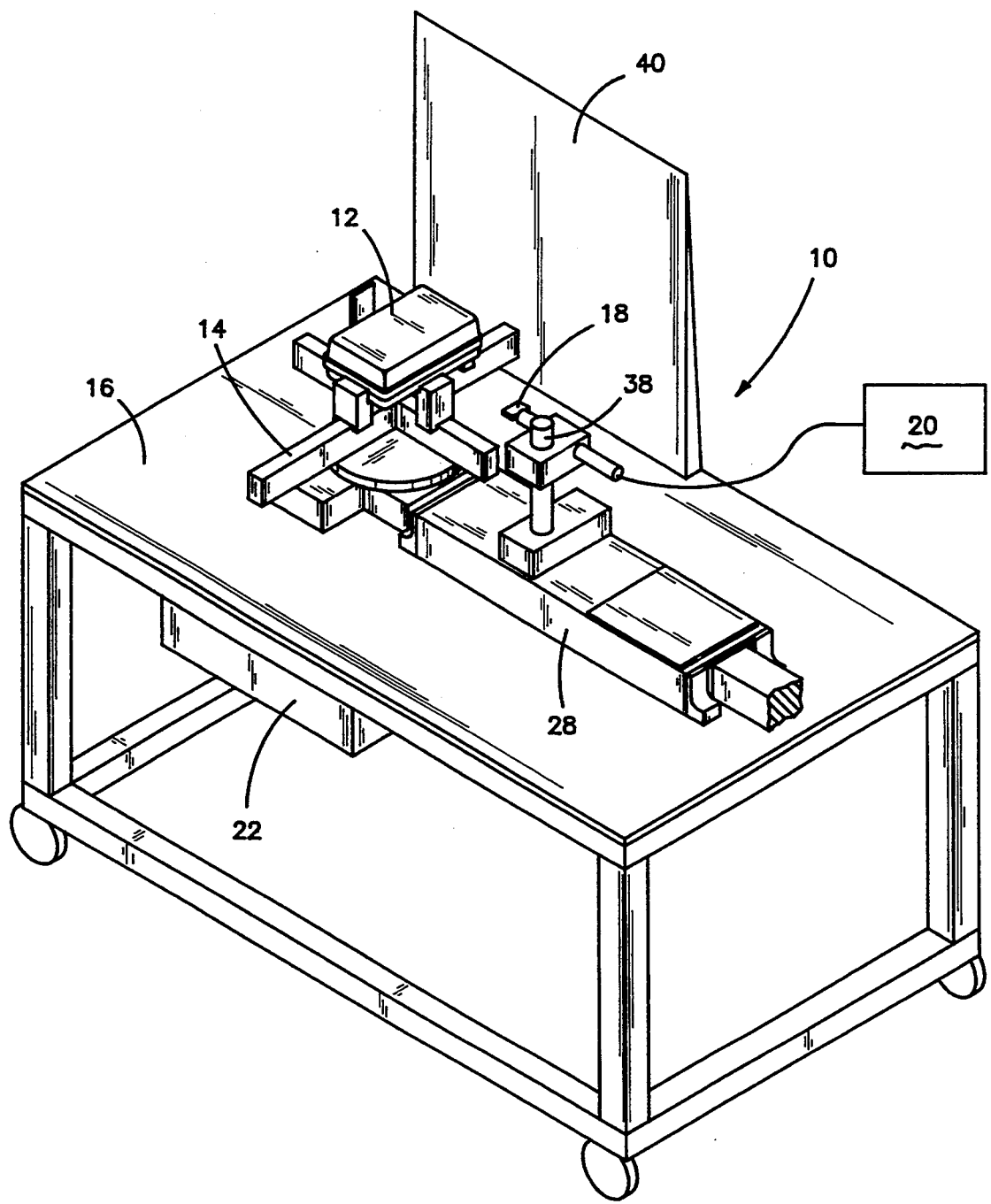
FIG. 1 is a perspective view of a flame trimming apparatus according to the invention.

Referring to the drawings, an apparatus according to the invention is generally indicated at 10. FIG. 1 shows a non-round workpiece 12, in this instance a rectangular plastic case, positioned on a support 14 which is rotatably mounted to base 16. Flame treatment is provided by a torch 18 which is slidably mounted to base 16.

Figure 3:
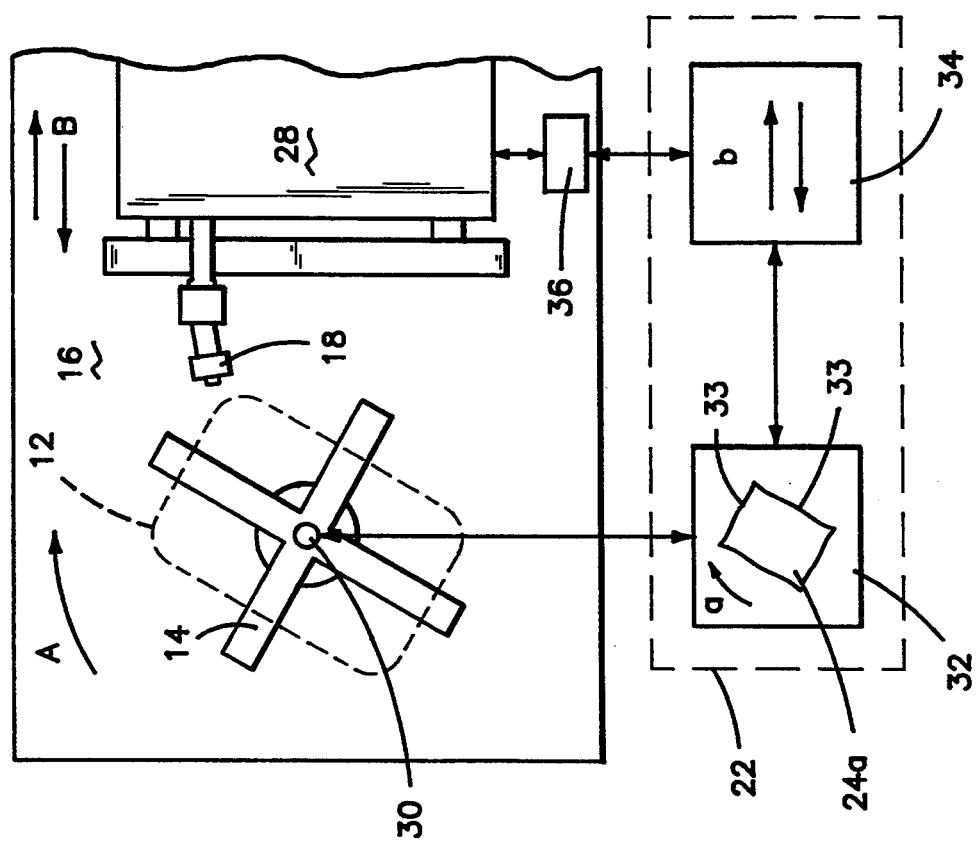
FIG. 3 is a partially schematic top view of a portion of a flame trimming apparatus illustrating an electronic cam for guiding the torch according to the invention.

Thus, support 14 serves to hold workpiece 12 in a rotatable manner relative to torch 18, and torch 18 is positionable, essentially longitudinally, relative to support 14. Support 14 may be any suitable structure adapted to hold workpiece in place as desired for treatment. Support 14 may suitably be a turntable structure, a cross bar structure (as shown in FIGS. 1 and 3), or any other desired structure which is mounted to base 16 so that support 14 is rotatable relative to torch 18.

Torch 18 is fed by a source of fuel 20 and provides a flame which is impinged upon sharp edges of the workpiece so as to provide a smooth round edge which is both safer and more pleasing in appearance.

In accordance with the invention, a control member 22 is provided for cooperating torch 18 with support 14 so that torch 18 follows the contour of a workpiece 12 positioned on support 14. Thus, as support 14 holding workpiece 12 is rotated, control member 22 serves to properly position and guide torch 18 relative to support 14 so that flame from torch 18 evenly impinges upon and thereby flame trims the sharp edge of the workpiece 12.

Figure 2:
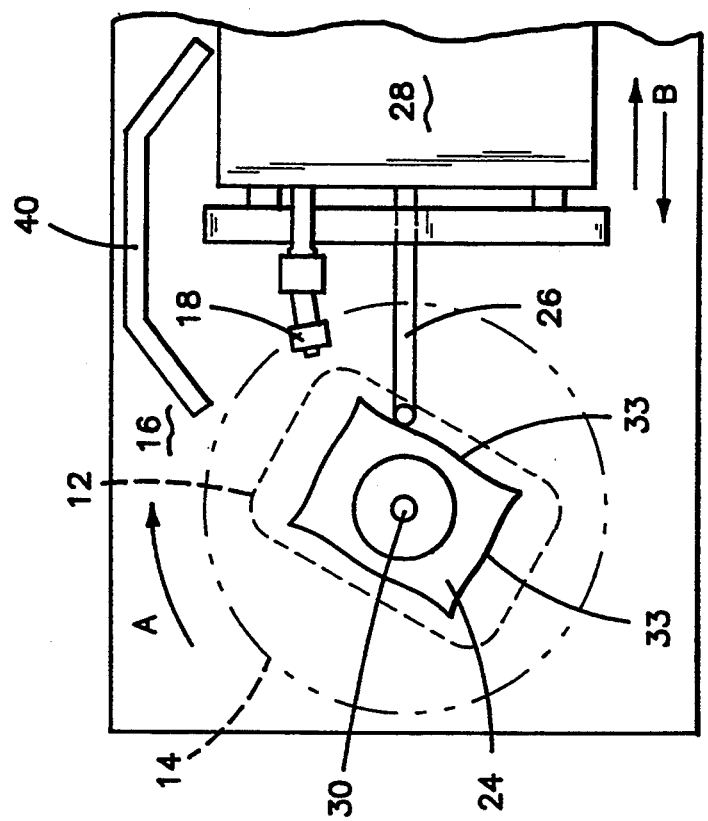
FIG. 2 is a top view of a portion of a flame trimming apparatus illustrating a mechanical cam structure.

FIG. 2 illustrates the use of a mechanical cam 24, which has a contour corresponding to that of workpiece 12, and a cam follower 26 attached to a carriage 28 for supporting torch 18, so as to cooperate torch 18 with workpiece 12. As workpiece 12 is rotate, for example in the direction of arrow A in FIG. 2, cam follower 26 follows the contour of cam 24 so as to linearly position torch 18 on carriage 28 as shown by arrows B. In this regard, cam 24 is preferably mounted on an axle 30 with support 14 so that cam 24 has corners, sides, and other contours corresponding with and aligned with corners, sides and other contours of workpiece 12. In this manner, cam follower 26 follows the contour of cam 24 and transmits rotation of cam 24 into the desired linear reciprocation of carriage 28. The embodiment of FIG. 2 is further described in and commonly assigned U.S. patent application Ser. No. 07/956,153, filed Oct. 5, 1992, now U.S. Pat. No. 5,273,422 which is hereby incorporated by reference.

For workpieces 12 of different shape, cam 24 is selected accordingly, so as to provide the proper guiding of torch 18.

FIG. 3 illustrates a preferred embodiment of the invention wherein the control member 22 includes a personal computer 32 or other device for generating an electronic cam or image 24a of workpiece 12 which is used to provide proper linear positioning of torch 18. As shown, torch 18 mounted on carriage 28 is connected to a motion controller 34 which receives commands from computer 32. Rotation (A) or the rotary position of workpiece 12 on support 14 is monitored by computer 32 and translated into rotation (a) of electronic image 24a. Commands generated in accordance with rotation (a) of electronic image 24a are transmitted to motion controller 34 and translated into commands for linear movement (b) of carriage 28, and thence to motive means 36 (shown schematically) for providing actual reciprocation or linear movement (B) of carriage 28 with torch 18 thereon.

Thus, as shown in both FIGS. 2 and 3, position of carriage 28 is determined by cam 24 or electronic image 24a so as to properly position torch 18 relative to workpiece 12 (shown in phantom in FIGS. 2 and 3).

It should be noted that while the preferred embodiment provides for support 14 to be rotatable relative to a radially fixed torch 18, the teachings of the present invention could be employed so as to provide a fixed support 14 and a torch 18 which rotates around the holding means to provide the relative rotation of the present invention.

As previously mentioned, the workpiece 12 shown in the drawings is a generally rectangular case. Cam 24 and electronic image 24a therefore have a corresponding shape or contour selected so as to guide torch 18 around the contour of a surface of workpiece 12 which is to be trimmed. Cam 24 and electronic image 24a are therefore preferably positioned and/or rotated in registry with workpiece 12 so that the sides of cam 24 and electronic image 24a are generally aligned with the sides of workpiece 12. For non-round workpieces having other shapes, electronic image 24a would be generated accordingly, thereby enhancing the versatility of the apparatus according to the invention in treating workpieces of widely varying sizes and shapes. Furthermore, generation of electronic image 24a and control of torch 18 in accordance with image 24a also avoids problems associated with the use of mechanical cams and followers in treating workpieces having steeply profiled surfaces.

As shown in FIGS. 2 and 3, cam 24 and image 24a may preferably have sides which are bowed outwardly toward center portions 33 thereof. This bowing helps to compensate for the angle of flame from torch 18 relative to workpiece 12. As support 14 rotates workpiece 12 relative to torch 18, the flame from torch 18 hits workpiece 12 at an angle near corners thereof. As straight surfaces of workpiece 12 rotate toward torch 18, the flame will become more perpendicular to the straight surfaces and will, therefore, have a greater impact on this portion of workpiece 12. The bowing of the center portions 33 corresponding to the center portions of the straight surfaces of the workpiece (where the flame will be most perpendicular) therefore serve to increase the distance between torch 18 and workpiece 12 as the angle of the flame approaches perpendicularity so as to compensate for this greater impact and provide an even trimming of workpiece 12.

Support 14 and cam 24 (FIG. 2) are preferably removably mounted to axle 30 to facilitate changing of cam 24. In this manner, apparatus 10 can be easily adapted to workpieces of different size and shape by changing cam 24 as appropriate. This removable mounting may be achieved by any means known in the art such as, for example, clips, bolts, screws, levers, or the like. As set forth above, the embodiment of FIG. 3 further facilitates treatment of various workpieces by facilitating the generation of electronic cams or images 24a as needed. Thus, with the embodiment of FIG. 3, advantageously, apparatus 10 can be adapted to treat a multitude of differently shaped workpieces without requiring the manufacture of a multitude of mechanical cams. Rather, a guiding electronic image 24a can be generated for any shape workpiece as desired.

Referring back to FIG. 1, torch 18 may preferably be pivotally mounted to carriage 28 so that torch 18 can be pivoted into and out of position relative to the workpiece 12. This allows torch 18 to be pivoted away from support 14, preferably in a cyclic fashion, based upon the time necessary for completely trimming a workpiece. FIG. 1 shows torch 18 pivotably mounted on a post 38 which is connected to carriage 28. The actual pivot motion may suitably be imparted by motion controller 34 or any other means known in the art. The time required for treating a workpiece will be related to the contour of the workpiece and the speed of rotation of the turntable. This time may be inputted into computer 32 so that operation of apparatus 10 can be further automated.

According to a preferred embodiment wherein torch 18 can be pivoted away from support 14, a shield 40 may preferably be disposed on base 16 in an area through which flame from torch 18 travels when torch 18 is pivoted. Shield 40 serves to protect persons and equipment in the immediate area of the apparatus 10 from incidental damage or injury from torch 18.

With general reference now to the drawings, the operation of the embodiment of FIG. 3 will be described.

A workpiece 12 is positioned on support 14. The shape of workpiece 12 is entered into computer 32 if it has not already been previously entered. Support 14 is then set to rotating. After support 14 "cues" to a starting position, torch 18 is pivoted into position and frame from torch 18 trims the sharp edge of workpiece 12 as desired. Torch 18 is positioned by controller 34 in accordance with electronic image 24a generated by computer 32. Torch 18 is thereby guided to follow the contours of workpiece 12. Upon completion of trimming of a workpiece 12, support 14 stops and torch 18 is pivoted away so that the next workpiece can be placed on support 14. Of course, if the next workpiece to be treated is the same as the previous workpiece, no new information needs to be provided to computer 32. Otherwise, the type of workpiece is entered as set forth above and the procedure continues.

In accordance with the invention, an apparatus is provided wherein non-round plastic molded articles are trimmed while avoiding the problems associated with hand trimming. The trimming is provided in a uniform and reliable manner. Furthermore, controlling the operation of apparatus 10, as accomplished with the embodiment of FIG. 3, avoids the need for providing different shaped cams 24 for workpieces of different shape and provides accurate reliable and consistent trimming of workpieces having widely varying contours and even steeply profiled surfaces.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for trimming a contoured non-round workpiece comprising:
   flame treatment means for trimming the workpiece by impinging a flame on the workpiece;
   holding means for supporting the workpiece, the holding means being rotatably mounted relative to the flame treatment means;
   control means for cooperating the holding means with the flame treatment means so that the flame treatment means follows the contour of the workpiece when the holding means is rotated relative to the flame treatment means;
   wherein the control means further includes means for linearly positioning the flame treatment means relative to the holding means based upon the contour of the workpiece in rotation; and
   wherein the control means comprises means for generating an electronic image having a contour following the contour of the workpiece, and means for guiding the flame treatment means according to the contour of the electronic image.

2. An apparatus according to claim 1, wherein the control means further comprises means for monitoring rotary position of the holding means relative to the flame treatment means, for correlating a rotary position of the electronic image to the rotary position of the holding means, and for positioning the flame treatment means according to the rotary position of the electronic image whereby the flame treatment means follows the contour of the workpiece as the holding means rotates relative to the flame treatment means.

3. An apparatus according to claim 1, wherein the control means comprises a personal computer programmed to generate the electronic image, and a motion controller, operatively connected to the personal computer and associated with the flame treatment means so as to linearly displace the flame treatment means toward and away from the holding means in accordance with the electronic image.

4. An apparatus according to claim 1, wherein the control means comprises means for generating the electronic image wherein portions of the electronic image which correspond to flat surfaces of the workpiece are outwardly bowed so as to increase the distance between the flame treatment means and the workpiece at the outwardly bowed portions.

5. An apparatus according to claim 1, wherein the holding means comprises a support member rotatably mounted relative to the flame treatment means and having means for supporting a workpiece thereon.

6. An apparatus according to claim 1, wherein the flame treatment means comprises a torch mounted on a carriage, and wherein the control means includes means for displacing the carriage relative to the holding means in registry with the electronic image, whereby the flame treatment means is guided along a surface of the workpiece.

7. An apparatus according to claim 1, wherein the flame treatment means is pivotally mounted relative to the holding means so that the flame treatment means can be pivoted away from the workpiece.

8. An apparatus according to claim 7, wherein treatment of each workpiece takes a treatment time, the apparatus further comprising means for cyclically pivoting the flame treatment means away from the workpiece upon expiration of the treatment time.

9. An apparatus according to claim 1, wherein the holding means is operative to support a workpiece consisting of an essentially rectangular plastic case.

10. An apparatus according to claim 9, wherein the control means comprises means for generating the electronic image having an essentially rectangular shape which essentially follows a contour of the plastic case.

11. An apparatus according to claim 1, wherein the holding means is operative to support a workpiece having four corners and wherein the control means comprises means for generating the electronic image having four corners essentially corresponding to the workpiece.

12. An apparatus according to claim 11, wherein said corners are essentially right angled corners.

13. A process for flame trimming contoured non-round workpieces, comprising the steps of:

providing means for holding a contoured non-round workpiece;

providing flame treatment means for trimming the workpieces by impinging a flame thereon, the flame treatment means and the holding means being positioned so that the holding means is rotatable relative to the flame treatment means and the flame treatment means is essentially linearly displaceable toward and away from the holding means;

rotating the holding means relative to the flame treatment means; and linearly positioning the flame treatment means relative to the holding means so as to follow a contour of the workpiece whereby sharp edges are trimmed from the workpiece.

14. A process according to claim 13, further including generating an electronic image having a contour corresponding to the contour of the workpiece; and positioning the flame treatment means according to the contour of the electronic image.

* * * * *